E. J. LEE.
TIMER.
APPLICATION FILED NOV. 12, 1920.
1,425,990.
Patented Aug. 15, 1922.
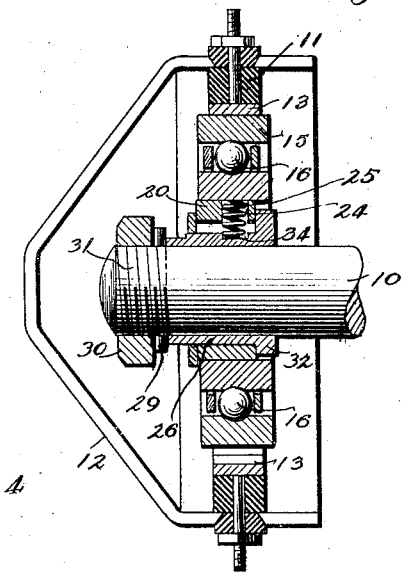
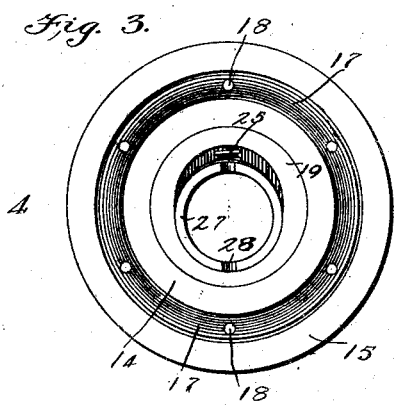
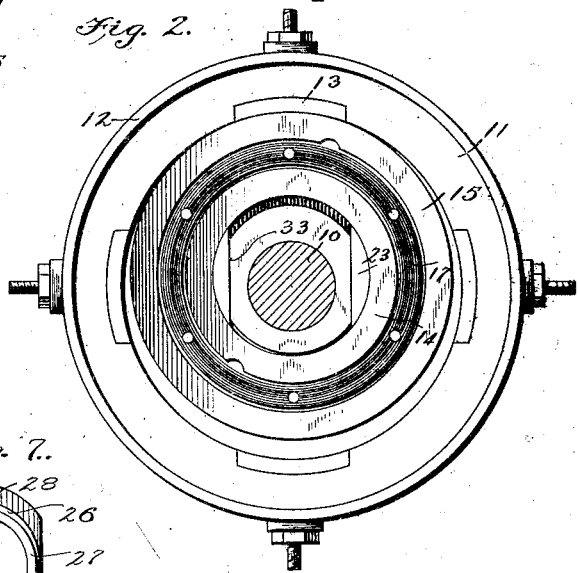
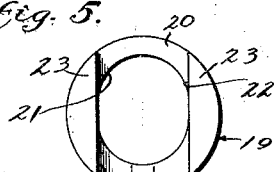
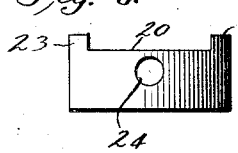
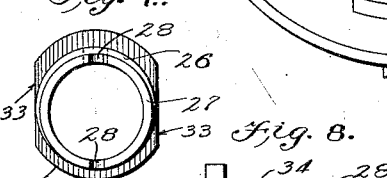
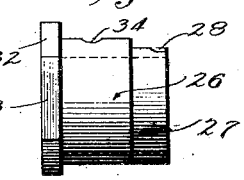
WITNESSES
INVENTOR
E. J. Lee.
BY
ATTORNEYS

UNITED STATES PATENT OFFICE.

ELMER JESSE LEE, OF BANGOR, PENNSYLVANIA.

TIMER.

1,425,990.  Specification of Letters Patent.  Patented Aug. 15, 1922.

Application filed November 12, 1920. Serial No. 423,623.

*To all whom it may concern:*

Be it known that I, ELMER JESSE LEE, a citizen of the United States, and a resident of Bangor, in the county of Northampton and State of Pennsylvania, have invented certain new and useful Improvements in Timers, of which the following is a specification.

My present invention relates generally to timers and more particularly to timers such as those employed in connection with the well known Ford automobile, my object being the provision of a construction and arrangement of parts which will be automatically adjustable to take up wear and will be continuously effective and efficient with very little if any wear or friction and without the necessity for the constant lubrication and replacement of worn parts required by those timers of the type at present used where a roller moving with the spring arm of the timer shaft operates against the contact annulus of the timer case or cover, which latter is usually oscillatable for spark adjustment purposes.

With my improved arrangement, instead of a small roller engaging the relatively stationary annulus, which requires constant and thorough lubrication and which subjects the parts to considerable wear even when in proper condition, I employ a contact member including inner and outer rings with anti-friction bearing members between the rings, the outer ring being of but slightly reduced diameter as compared to the diameter of the annulus and being capable of a freely rolling contact therewith under the throw of a cam engaging the inner ring and actuated by the timer shaft, the cam including automatically adjustable spring controlled parts which are shiftable relatively to one another in the direction of the throw of the cam so as to constantly take up what little wear there is and which in the present construction will be uniform, and also serve to yieldingly press one point of the outer contact ring in constant close and yielding engagement with the contact carrying annulus.

In carrying out my invention in such manner as to accomplish these and certain other objects and advantages, I preferably employ the construction shown in the accompanying drawing, which forms a part of this specification, and in which, Figure 1 is a sectional view taken diametrically through a Ford timer showing the application of my invention thereto, Figure 2 is a side view of Figure 1, Figure 3 is a detail side view of the contact member removed, Figure 4 is a section taken diametrically therethrough on the line 4—4 of Figure 3, Figure 5 is a detail end view of the outer part of the adjustable throw cam, Figure 6 is a plan view thereof, Figure 7 is a detail end view of the inner part of the cam; and Figure 8 is a detail side view of the part shown in Figure 7.

Referring now to these figures I have shown in Figures 1 and 2 a timer arrangement in which the timer shaft 10 is in concentric relation to and within the distributing annulus 11 of the cover or case 12, which annulus is usually formed of non-conducting material and has a circumferential series of embedded contact members or distributing points 13. This is the common construction of timer as used on Ford automobiles, the cover or case 12 being oscillatable for adjustment purposes and being stationary relative to the rotating timer shaft 10 in the actual distributing operation.

In the ordinary construction an arm outstands from the timer shaft and has a small contact roller moving against the inner surface of the annulus 11, which requires constant and careful lubrication, and which, even when in proper operative condition causes considerable wear resulting from the friction of this necessarily rapidly rotating roller with the annulus.

To avoid these disadvantages I propose a contact member including an adjustable throw cam and an annulus engaging member actuated by the cam including inner and outer circular rings 14 and 15 having anti-friction balls 16 therebetween so as to render one freely rotatable with respect to the other. These rings have grooves around their inner surfaces and each has a notch at one side so that when the notches are in registry the anti-friction balls 16 may be inserted one at a time into the annular grooves forming the ball race, ball retaining side rings 17 being then placed at opposite sides of the annular series of balls and connected by rivets or studs 18 so as to thereafter hold the annular series of balls in place, these balls also operating to prevent lateral displacement of the inner and outer rings 14 and 15.

The outer ring 15 is of slightly reduced diameter as compared to the contact carrying annulus 11, and the inner ring is of such internal diameter as to receive the outer cylindrical surface 19 of a collar 20 which forms the outer adjustable part of a cam and is provided with a bore 21 elongated in one direction parallel to the inner straight and flat surfaces 22 of a pair of endwise projecting ribs 23. This part of the cam also has a radial opening 24 which receives therethrough a coil spring 25, the outer end of which bears against the inner surface of the inner ring 14 as seen in Figure 1.

The inner part or sleeve 26 of the cam has a bore to receive and snugly fit the timer shaft 10 and has its cam shaped body disposed within the bore 21 of the collar 20, with an extension 27 at one end provided with diametrically opposed recesses 28 to receive opposite ends of a locking pin 29 which is extended for this purpose through a diametrical opening of the timer shaft 10 and may be locked by engagement with the usual nut 30 screwing on the threaded extremity 31 of the timer shaft.

At its opposite end the inner cam shaped part or sleeve 26 has a flanged head 32 which is provided with parallel flattened sides 33 slidably engaging the inner flat surfaces 22 of the endwise projecting ribs 23 of collar 20.

It thus becomes obvious that the two parts of the cam will move as one in so far as rotation is concerned, together with the inner ring 14 in which the collar 20 has a tight forced fit, and it is equally obvious that by virtue of the laterally elongated or oval shaped bore 21 of the outer part, with the spring 25 engaging the inner ring 14 and also a depressed seat 34 of the inner part 26, the latter will be constantly placed under tension operating to shift the same in constantly increasing eccentric relation to the outer part or collar as well as the ring 14 in taking up wear between the outer ring 15 and the annulus 11.

In view of the nearly similar diameters of the outer ring 15 and the annulus 11 and the fact that the latter is capable of a free rolling contact with the annulus reduces wear to a minimum however and insures that this wear is even and uniform on account of the relatively greater area of contact between these parts than ordinarily exists between the annulus and a small roller, and the fact of this relatively large area of contact coupled with the fact that the outer ring is held by the automatically adjustable spring controlled cam in close uniform and yielding contact with the annulus promotes a much more effective contact than can be obtained with the usual construction.

I claim:

1. A contact member for ignition timers having a rotating timer shaft and a relatively stationary distributing annulus provided with distributing points and disposed in spaced concentric relation around the shaft, said member consisting of a pair of relatively rotatable rings, the outer ring of which is of slightly reduced diameter as compared to the inner surface of the annulus and is engageable with said surface, and an automatically adjustable cam in two spring controlled parts, one part of which is fixed within the inner ring and the other part of which is secured on the timer shaft.

2. In a timer, a contact member including inner and outer rings, anti-friction means between the rings, a collar fixed in the inner ring having a laterally elongated bore and endwise projecting ribs provided with parallel opposing surfaces, and a sleeve within the collar having an eccentric bore and a flanged head at one end provided with flattened side faces between the ribs of the collar, and a spring seated within the collar and compressed between the sleeve and the inner ring.

3. A contact member for timers including inner and outer rings, anti-friction bearings between the rings, a collar fixed within the inner ring, a sleeve within the collar and shiftable with respect thereto radially of the rings, said sleeve and said collar having means in movable engagement constraining the same to simultaneous rotation, and a spring held by the collar and compressed between the inner ring and the sleeve for the purpose described.

ELMER JESSE LEE.